United States Patent [19]

Kreft

[11] Patent Number: 5,376,778

[45] Date of Patent: Dec. 27, 1994

[54] CONTACT-FREE CHIP CARD FOR REMOTE TRANSMISSION

[75] Inventor: Hans-Diedrich Kreft, Dassendorf, Germany

[73] Assignee: Angewandte Digital Electronik GmbH, Dassendorf, Germany

[21] Appl. No.: 20,725

[22] Filed: Feb. 22, 1993

[30] Foreign Application Priority Data

Feb. 26, 1992 [DE] Germany ............... 4205827

[51] Int. Cl.[5] ........................ G06K 5/00
[52] U.S. Cl. ..................... 235/382; 235/380; 235/492
[58] Field of Search ........... 235/492, 379, 380, 382, 235/382.5; 342/51, 50, 44; 340/825.54, 825.34

[56] References Cited

U.S. PATENT DOCUMENTS 4,223,830  9/1980  Walton ............... 342/44 X
4,656,472  4/1987  Walton ............... 342/44 X
4,697,183  9/1987  Jenning et al. ........ 340/870.25
4,797,542  1/1989  Hara .................. 235/380

FOREIGN PATENT DOCUMENTS 534559  3/1993  United Kingdom ....... 235/492

Primary Examiner—John Shepperd
Attorney, Agent, or Firm—Hill, Steadman & Simpson

[57] ABSTRACT

Chip cards that operate contact-free are supplemented by additional elements to enable remote transmission of data. Also, elements include sensors that enable the acquisition of physical, chemical or biological information from the environment of the card. Further, the card includes elements for storing electrical energy, electronic components for constructing an electronic oscillation circuit for the remote transmission and reception of data, as well as a switch accessible by a user for selectively connecting the energy storage elements to the electronic components thereby forming an electromagnetic oscillation circuit for the transmission of electromagnetic oscillations with information modulated thereon. In a preferred embodiment, one or both of the coils that are provided on the card are connected via the switch such that the coils serve as an antenna for the electromagnetic oscillation circuit for the remote transmission of data. In addition, the electronic oscillation circuit operates at a frequency which differs sufficiently from the frequency used in the short-distance transmission and also lies outside of the harmonics of the short-distance transmission so that a receiver of the information can differentiate merely on the basis of frequency, whether the remote transmission or the short-distance transmission is active.

10 Claims, 1 Drawing Sheet

CONTACT-FREE CHIP CARD FOR REMOTE TRANSMISSION

BACKGROUND OF THE INVENTION

Field of the Invention

The present invention relates to cards carrying microelectronic circuits on chips (chip cards) and more particularly to chip cards having non-contact data transmission capability.

Electronically readable plastic cards that are currently employed preferably work according to two methods. Cards having magnetic stripes that contain no microprocessor chip (chip) for storage and processing of information are most widespread. Cards that contain a chip in which information can be reliably stored and electronically modified are being increasingly utilized. These cards are referred to as chip cards or smart cards. Supplying the chips required on the card with current and voltage occurs via contacts or occurs contact-free according to a method such as set forth in U.S. Pat. No. 4,697,183. Upon employment of the teachings of that patent, chip card systems work contact-free in that energy and data transmission ensue inductively.

The commercially available methods employing the teachings of U.S. Pat. No. 4,697,183 require an extremely close spatial coupling of less than 5 mm distance between the coils on the chip card and the coils in the write/read system. This tight coupling is desirable in many instances in order to make it impossible for unauthorized persons to interrogate the data of a card over a distance.

However, applications are also desirable wherein the card is intended to output its information over a greater distance. This is particularly the case given pure identifications when it is only a matter of acquiring a characteristic card number, as required in the case of access controls.

SUMMARY OF THE INVENTION

The present invention utilizes a chip card having component parts therein for the receipt and transmission of information. Specifically, the card includes a microcomputer chip and memory along with two coils which provide contact free coupling with coils of a stationary microstation. The card includes additional components such as a means for storing electrical charge, electronic component means for constructing an electromagnetic oscillation circuit for the remote transmission and reception of data as well as a switch accessible from the outside of the card for manual use. The electronic component means forms an active electromagnetic oscillation circuit in combination with the storage means when the switch is operated to connect the storage means to the electronic component means. The electromagnetic oscillation circuit produces a transmission of electromagnetic oscillations with information modulated thereon. In a preferred embodiment, one or both of the coils that are contained as components on the card are connected such by the switch to the electronic component means that the coil or coils serve as an antenna coil of the electromagnetic oscillation circuit for the remote transmission of data. Further, the electronic component means is dimensioned such that an electronic oscillation circuit results with a frequency which differs sufficiently from the frequency for short-distance transmission and is not in the region of one of the harmonics of the short distance transmission component parts, so that a receiver of the information can decide merely on the basis of the frequency whether the remote transmission is activated or the short-distance transmission is active.

In a further embodiment of the invention, the function of the switch may be modified by information stored in the component parts on the chip card, thereby permitting the function of the remote transmission to be modified.

A sensor may be provided on the chip card for the registration of physical, chemical and/or biological information. A further component part may be provided for outputting physical, chemical and/or biological information stored on the card. A sensor may be linked to other component parts on the card such that the information received from the sensor is stored in a memory of one of the components on the card. The information received from the sensor also may be utilized in modifying the function of the card.

DETAILED DESCRIPTION OF THE PREFERRED EMBODIMENTS

Figure 1:
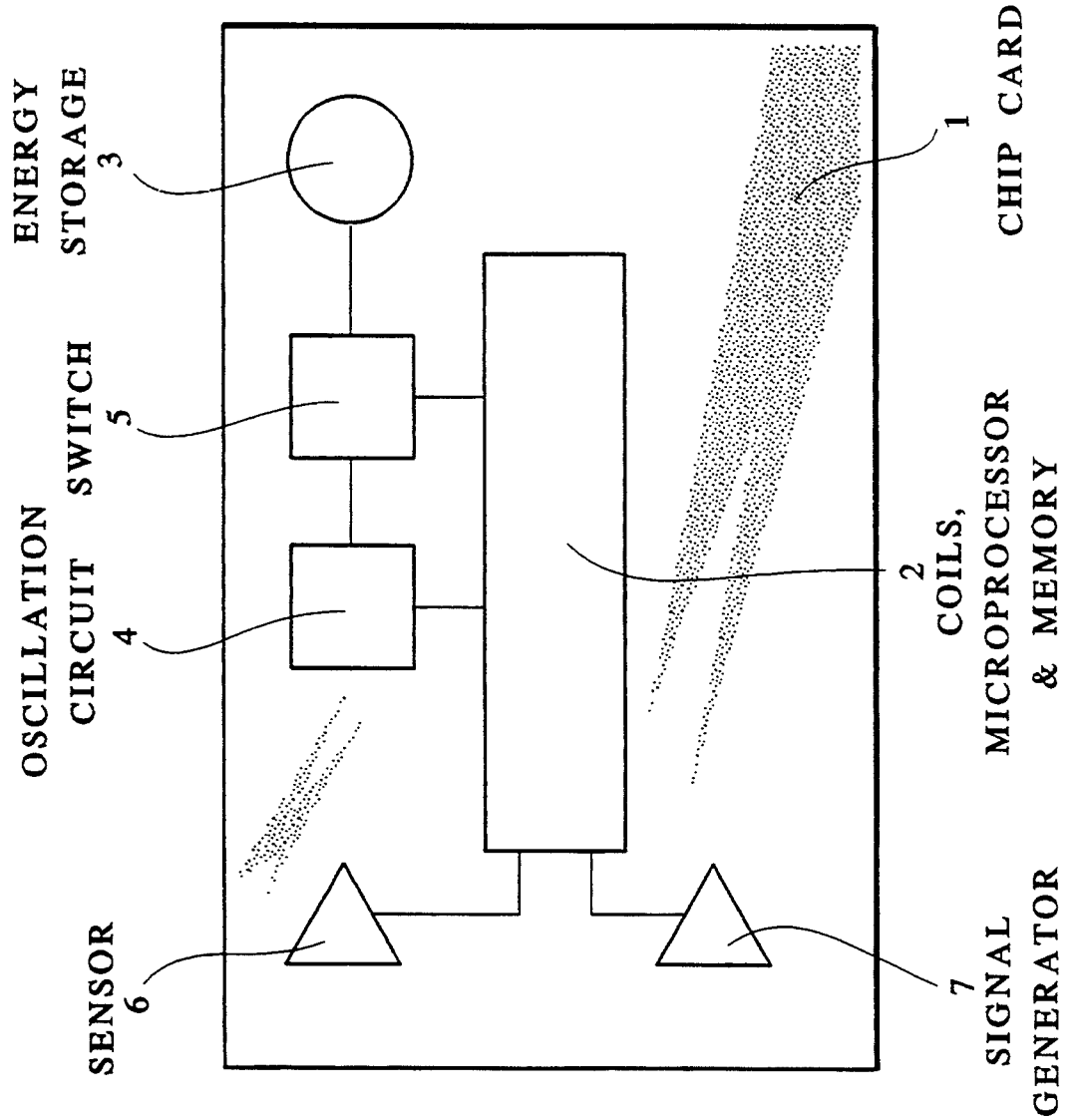
FIG. 1 is a schematic view of a chip card embodying the principles of the present invention.

FIG. 1 schematically shows a chip card 1 having various component parts, these usually being invisibly embedded in the card body 1. Component part 2 contains the electronic elements as are usually required for the function of a card according to U.S. Pat. No. 4,697,783, which disclosure is incorporated herein by reference. This essentially involves a microprocessor and memory and two coils for bidirectional data transmission that simultaneously serve for the reception of energy according to the transformer principle. Component part 3 may be a battery, accumulator, capacitor, or other circuit means for storing electrical energy. A component part 4 contains the elements of an electronic oscillation circuit such as coils or inductors and capacitors. In an embodiment switch 5 allows operations on the function of the chip card to be performed from the outside and allows connections between the individual component parts to be produced on the basis of operation by the user of the chip card. A component part 6 is fashioned as a sensor for the greatest variety of signals to which a chip card is exposed. A component part 7 is fashioned as a signal generator.

The energy storage means 3 can be connected to the component parts of the oscillation circuit 4 for the activation thereof with the switch 5 that is accessible from the outside of the card, i.e. that is accessible to the user of the chip card. Since the remote transmission of data of the chip card is desired only in special instances, the user makes the decisions about this function via the switch 5. A card equipped in this way, for example, makes it possible to enable the access control of a person across a distance. The card user no longer has to insert the card into a slot. Instead, the remote transmission is activated by the card user in the region of the access control and the code of the card is transmitted to the receiver. Subsequently, the remote transmission can be deactivated with the switch 5. Alternative embodiments for the external mechanical switch 5 of course are possible and apparent to those skilled in the art.

As disclosed in U.S. Pat. No. 4,697,183, two coils are used in component part 2. These coils can likewise be employed as antenna coils for the remote transmission. To this end, the switch 5 switches elements of the component part 4, for example, capacitors, as elements of oscillation circuits, in series or in series with the coils in the component part 2. The coils of the component part 2 provide for a double function by this switching, since they are used both for short-distance as well as for remote transmission. Thus, the plurality of elements of the component part 4 is reduced by using the antenna coils of component part 2, this being expedient because of the limited space on the card 1 and the resulting reduced the manufacturing costs.

In addition to transmitting the desired frequencies, the card transmits further frequencies as harmonics having lower energy content when a card according to the teachings of U.S. Pat. No. 4,697,183 is used. Upon reception of these harmonic frequencies, a receiver could proceed on the basis of a remote transmission of the elements 2, 4 activated by the switch 5 and attempt to acquire information from the oscillation. When the frequencies of the remote transmission differ substantially in value from the harmonics of the frequencies of the short-distance transmission, this confusion cannot occur. Upon reception of the remote transmission frequency, a receiver can proceed on the assumption of an activated remote transmission.

The electronics in component part 2 usually contains a microprocessor with memory. When specific information conforming to the employment according to U.S. Pat. No. 4,697,183 are written into the memory, the function of the switch 5 can be dependent on the memory content. Thus, for example, the switch can be deactivated or initially activated when a specific identifier (PIN code) according to the disclosure of the '183 patent is input. Additionally, inputs to the sensor 6 can be used to enable remote transmission when the inputs correlate with information stored in the memory of the card. For example, the switch can also be inhibited within a time span. The information that is remotely transmitted can also be composed dependent on the information in the memory of component part 2.

Additional information from the environment of the card may also be processed. With proper miniaturization of electronic and mechanical components (silicon mechanics), it is possible to accommodate sensors in the card that can be viewed as being a card employment recorder. Temperature sensors, acceleration sensors, and sound sensors can provide a sequence of the utilization of the card together with the deposited time. It is also possible, however, to employ the acoustic image of the voice of the card carrier for encoding purposes. The various sensors on the card can serve for the registration of information. Independently of its function as sensor, component part 6 can also be fashioned as a transmitter in addition to or independently of its sensor function. It is thus conceivable to also transmit information via an infrared diode or a sound source. The received information can be used by the processor of component part 2 in order to control functions dependent on the sensor values. Enabling specific functions can, for example, be dependent on the received acoustic image. When a pre-set temperature on the card is upwardly exceeded, the processor can automatically burn out a transistor section, so that it can be documented given later analysis that the card was exposed to a high temperature.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. In a contact-free chip card of the type having electronic component means including a microprocessor, a memory, and having at least one coil for the short distance transmission of energy and data" the improvement comprising:
    an oscillator means for storing electrical energy for contact-free, remote transmission of data; and
    enabling means accessible to a user for selectively connecting said energy storage means to said electronic component means to energize said oscillator and said at least one coil for said remote transmission, said enabling means being responsive to an input.

2. A chip card according to claim 1, wherein said enabling means selectively connects said energy storage means to said oscillator to form an active electromagnetic oscillation circuit in combination with said energy storage means to produce a transmission of electromagnetic oscillations with information modulated thereon.

3. A chip card according to claim 2, wherein said enabling means connects said at least one coil of said electronic component means such that said coil serves as an antenna coil of said electromagnetic oscillation circuit for said remote transmission of data.

4. A chip card according to claim 2, wherein said electromagnetic oscillation circuit provides a frequency for said remote transmission that adequately differs from a frequency for short-distance transmission and said frequency further differs from the harmonics of said short-distance transmission, so that a receiver can differentiate whether said remote transmission or said short-distance transmission is active.

5. A chip card according to claim 1, further comprising information stored in said memory to enable said remote transmission when said input correlates with said stored memory context information.

6. A chip card according to claim 5, further comprising a sensor for the registration of at least one type of information selected from the group consisting of physical, chemical, and biological information.

7. A chip card according to claim 1, further comprising means for outputting said at least one type of information stored on said card.

8. A chip card according to claim 6, wherein said sensor is connected to said memory to deposit said information received from said sensor in said memory.

9. A chip card according to claim 6 wherein said sensor is connected to said microprocessor so that the information received from said sensor is capable of enabling said remote transmission when said information received from said sensor correlates with said stored information.

10. A chip card according to claim 1, wherein said enabling means accessible to a user for selectively connecting said means for storing electrical energy to said electronic components means to energize said at least one coil for said remote transmission is an external switch mounted on the card.

* * * * *